April 9, 1935.  O. L. STRAUSBORGER  1,996,776
ARTIFICIAL FISHING BAIT OR LURE
Filed April 28, 1932
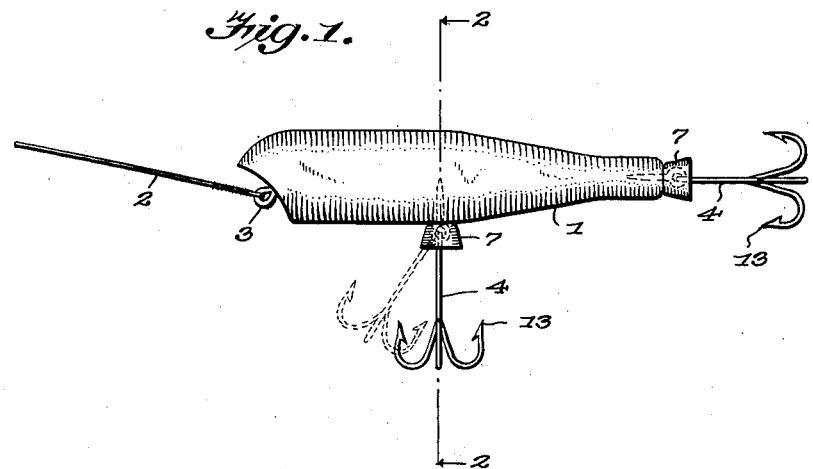
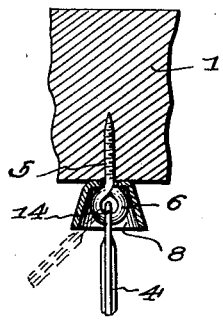
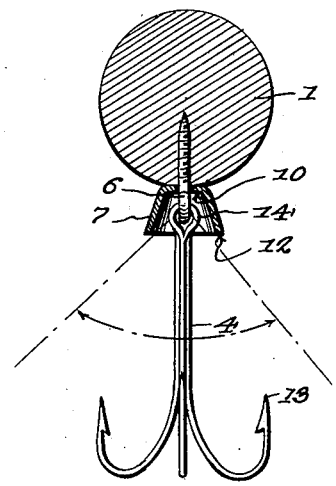
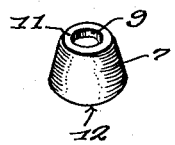
Inventor
OSCAR L. STRAUSBORGER
By *Irving A. McCathran*
Attorney Patented Apr. 9, 1935

1,996,776

UNITED STATES PATENT OFFICE 1,996,776

ARTIFICIAL FISHING BAIT OR LURE

Oscar L. Strausborger, Edon, Ohio

Application April 28, 1932, Serial No. 608,067

1 Claim. (Cl. 43—46)

This invention relates to an artificial fishing bait or lure, and has for its object the production of a simple and efficient means for supporting the hooks in such a manner as to hold the points thereof out of contact with the body of the bait or lure.

Another object of this invention is the production of a simple and efficient means for supporting the inner pivoted end of the hook in engagement with the body of the fishing bait or lure, so as to limit the swing of the hook and in this way hold the points out of contact with the body of the bait.

Other objects and advantages of the present invention will appear throughout the following specification and claim.

In the drawing:—

Figure 1 is a side elevation of the artificial bait or lure;

Figure 2 is a section taken on line 2—2 of Figure 1;

Figure 3 is a section taken at right angles to that shown in Figure 2; and

Figure 4 is a detail perspective of the cup which limits the swing of the hooks with respect to the body of the bait or lure.

One difficulty experienced in connection with bait or lures of the standard type is that the points of the hooks are likely to come into contact with the body of the bait and chip off the paint and dig holes into the body, which holes become watersoaked and make the body heavy and cumbersome. By means of the present invention, however, the supporting cup, as illustrated and described, will limit the swing of the hook so as to prevent the points of the hooks from coming into contact with the body of the bait or lure.

By referring to the drawing, it will be seen that 1 designates the body of the fish bait or lure which may be of any suitable or desired type, and which may be secured to the line 2 in any suitable or desired manner, such for instance as by means of the eye 3.

As is the custom, a plurality of hooks 4 are secured at desired points upon the body 1, and in the structure as illustrated, the hooks 4 are secured to the body 1 by means of the threaded eye-screws 5, the threaded eye-screws 5 being provided with enlarged eye portions 6, as shown. Cup members 7 are fitted over these securing eye-screws 5, the enlarged eye portions 6 of the eye-screws fitting within the socket portions 8 of the cup 7, as shown in Figures 2 and 3 of the drawing, the shank portions of the screws 5 extending through apertures 9. The enlarged head or eye 6 of the screw-eye 5 will abut against the inner end walls 10 and in this way assist in firmly holding the flattened ends 11 of the cup 7 against the side of the body 1, as shown. The cup 7 is provided with outwardly flared sides and is of material length, so as to cause the outer periphery 12 thereof to constitute an abutment for limiting the swing of the hooks 4 and thereby preventing the points 13 of the hooks from coming into contact with the body 1. The hooks 4 are secured to the eye portions 6 of the screw-eyes 5 by means of an eye connection 14, so as to allow the free swinging of the hooks 4, the outer periphery 12 of the cup 7, in each instance, preventing the swinging of the points of the hooks into contact with the body 1. It should also be noted that since the cup is secured at its upper end to the body and extends downwardly therefrom, as shown in Figures 1 and 2, it will serve as a guide against which water flowing longitudinally of the body 1 will act to retain the body in the upright position shown in these figures, and prevent it from spinning.

From the foregoing description, it will be seen that a very simple and efficient means has been provided for limiting the swing of the hooks with respect to the body and in this way preventing the points of the hooks from digging into the body, as previously described.

It should be understood that certain detail changes in the mechanical construction may be employed without departing from the spirit of the invention, so long as these changes fall within the scope of the appended claim.

Having described the invention, what is claimed as new is:—

As a new article of manufacture, an artificial bait comprising an elongated body, a thimble-like cup having an outwardly flared skirt and a flat end wall to fit snugly against the under face of said body with the cup depending from the body, a hook supporting screw eye having a threaded shank passing through the end wall of the cup and screwed into the body with the eye of the screw completely housed in the cup and abutting against the inner face of the end wall whereby said cup will be firmly held in contact with the face of the body for completely sealing the body around the hook supporting eye, and a fish hook having an eye engaged through the eye of the screw eye, the outer edge of the skirt portion of said cup projecting beyond the united eyes of the screw eye and fish hook to limit the swing of the fish hook by engagement of the shank of the hook with the edge of the skirt whereby the points of the fish hook will be at all times held out of contact with said body and the depending cup constitutes a guide acted upon by flow of water longitudinally of the body for maintaining the body in a horizontal position in the water and preventing the body from spinning.

OSCAR L. STRAUSBORGER.